United States Patent [19]

Yang

[11] Patent Number: 5,410,239

[45] Date of Patent: Apr. 25, 1995

[54] BATTERY CHARGER WITH CAPACITY MONITOR

[76] Inventor: Tai-Her Yang, 5-1 Taipin Street, Si-Hu Town, Dzan-Hwa, Taiwan, Prov. of China

[21] Appl. No.: 6,237

[22] Filed: Jan. 19, 1993

Related U.S. Application Data

[63] Continuation-in-part of Ser. No. 862,811, Apr. 3, 1992, abandoned.

[51] Int. Cl.⁶ .............................................. H02J 1/00
[52] U.S. Cl. ..................................... 320/43; 320/48; 340/636
[58] Field of Search ................. 320/43, 44, 33, 48; 324/426, 427, 430, 434, 435; 340/636

[56] References Cited

U.S. PATENT DOCUMENTS

| | | | |
|---|---|---|---|
| 3,676,770 | 7/1972 | Sharaf et al. | 320/43 X |
| 3,680,072 | 7/1972 | Charbonnier et al. | 320/43 X |
| 3,890,556 | 6/1975 | Melling et al. | 320/43 X |
| 4,151,454 | 4/1979 | Iida | 320/48 |
| 4,247,812 | 1/1981 | Patry et al. | 320/44 |
| 4,520,353 | 5/1985 | McAuliffe | 340/636 |
| 5,126,675 | 6/1992 | Yang | 324/435 |

*Primary Examiner*—Kristine L. Peckman
*Attorney, Agent, or Firm*—Leonard Bloom

[57] ABSTRACT

An automatic shut-off battery charging system which employs a timing control circuit (TC101) to initiate intermittent monitoring of the equivalent internal resistance of a load battery (B101) under charge, and a comparison circuit (PD101) which disables charging when the internal resistance indicates that the battery is charged to capacity.

8 Claims, 2 Drawing Sheets

BATTERY CHARGER WITH CAPACITY MONITOR

CROSS-REFERENCE TO RELATED APPLICATION

The present application is a continuation-in-part of application Ser. No. 07/862,811, filed Apr. 3, 1992, now abandoned.

BACKGROUND OF THE INVENTION

1. Field of the Invention

The present invention relates to battery chargers and, more particularly, to an automatic shut-off battery charging system which intermittently monitors the equivalent internal resistance of a load battery under charge, and which disables charging when the internal resistance indicates that the battery is charged to capacity.

2. Description of the Background

Conventional battery charging systems having an automatic shut-off feature disable further charging in accordance with a predetermined load voltage, load current, time limit, or rise in battery temperature. However, none of these methods indicate the discharge capacity of the battery, and hence, they do not yield an accurate indication of the remaining charge capacity of the battery under charge. Consequently, existing charging systems frequently overcharge the battery, and thereby waste energy and shorten the useful life of battery.

One of the most accurate methods for determining battery capacity is by measuring the specific gravity of the electrolyte. Unfortunately, measurement of a battery's specific gravity is a complex and troublesome task. A more practical method is by measuring the equivalent internal resistance of the battery, i.e., determining the reduction in voltage supplied by the battery as a function of load. The battery's internal resistance is proportional to the level of charge. Hence, saturation may be determined with accuracy. For a great while, this was considered a complex measurement which required a complex electrometer capable of applying a series of low resistance loads directly across the positive and negative terminals of the battery. Such electrometers resulted in a great current drain to the battery which consumed power and induced sparking. Moreover, the temperature of battery could rise to extreme temperatures.

U.S. Pat. No. 5,126,675 issued to Yang provides a partial solution in the form of a simple and inexpensive battery capacity monitor which indicates the remaining capacity of a battery by indirect measurement of the equivalent internal resistance. The Yang '675 device momentarily applies an RC load across the battery terminals and measures the peak capacitive charge which is indicative of the equivalent internal resistance, which in turn can be correlated to the remaining battery capacity.

Although the Yang '675 device succeeds in giving a simpler yet more accurate indication of the remaining charge capacity, the device is only a monitor. It would be greatly advantageous if the theory of monitoring as set forth in Yang '675 could be incorporated as an automatic shut-off feature in a battery charging system.

SUMMARY OF THE INVENTION

Accordingly, it is an object of the present invention to provide a battery charger which monitors the equivalent internal resistance of the battery under charge, and which disables further charging when the internal resistance has risen to a predetermined value indicative of charge "saturation."

It is a further object of the invention to provide a battery charger with an automatic shut-off feature based on intermittent monitoring of the remaining charge capacity of a battery in the above-described manner by applying an RC load across the battery terminals and indicating the peak capacitive charge.

It is another object of the present invention to provide a simple and inexpensive battery charger as described above which accomplishes the automatic shut-off feature with minimal additional power drain.

In accordance with the above-described objects, the present invention provides an improved automatic shut-off charging system for charging a battery. The charging system includes a DC power supply, a main switch connected in series between the DC power supply and the battery for selectively applying DC power for charging of the battery. The automatic shut-off feature comprises a temporary load selectively connectable in parallel with the battery to thereby establish a reference voltage which is indicative of the equivalent internal resistance of the battery. In addition, a test switch is normally connected in series between the DC power supply and the battery. However, the test switch is selectively actuable to break the series connection between the DC power supply and the battery and to instead connect the temporary load in parallel with the battery. A timing control circuit is connected to the test switch for intermittently energizing the test switch at set time intervals as described above to break the series connection between the DC power supply and battery and to connect the temporary load instead. A comparison circuit is coupled to the temporary load through an optional calibrating voltage regulator for monitoring the reference voltage appearing across the temporary load. The comparison circuit is also connected to the main switch for energizing the main switch when the reference voltage corresponds to a predetermined threshold, thereby removing DC power and disabling further charging when the battery is fully charged.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE INVENTION

Figure 1:
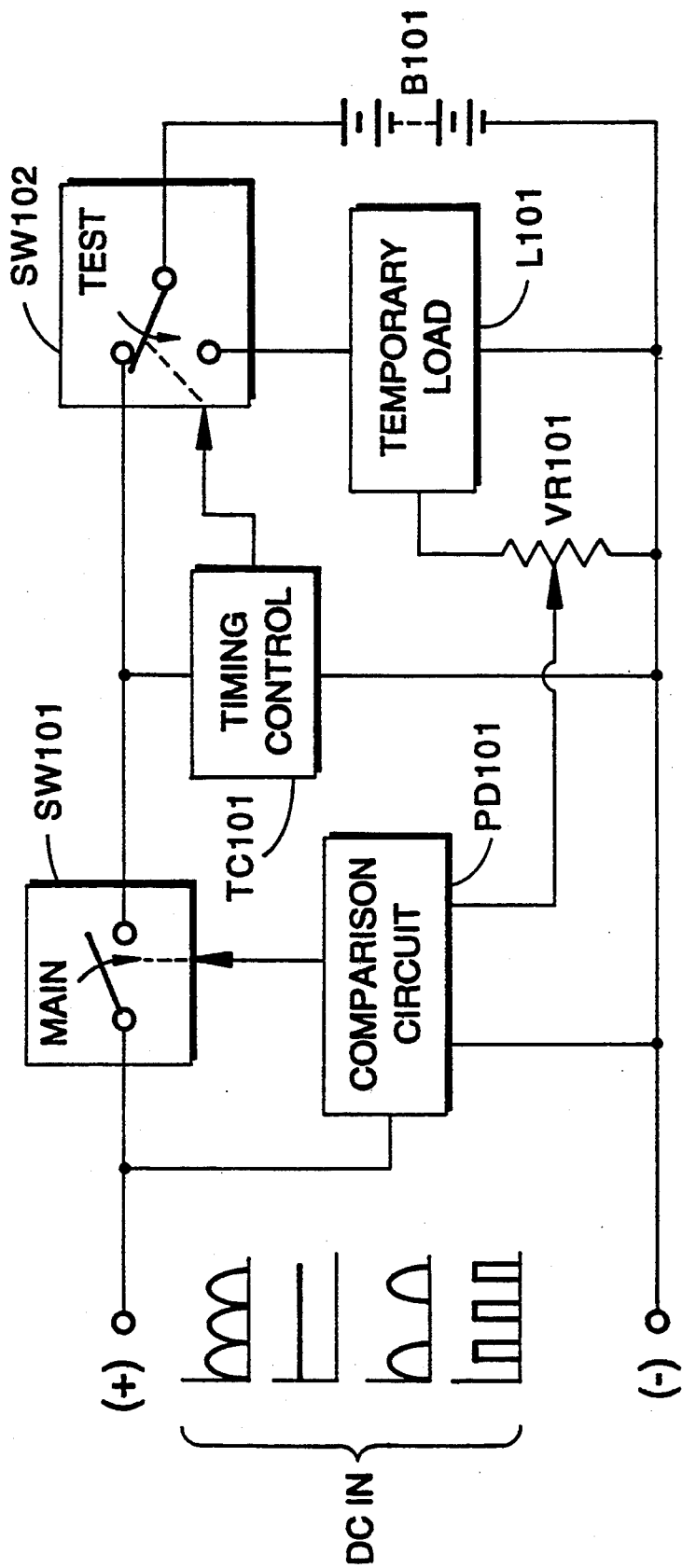
FIG. 1 is a block diagram of a battery charging system with automatic shut-off feature in accordance with the present invention.

FIG. 1 illustrates a battery charging system with automatic shut-off feature in accordance with the present invention.

The system is powered by a DC power supply connected across terminals (+) and (−). As shown in brackets, the input power DC IN may be a rectified AC signal, commutated AC signal, pulsed DC, level DC, or any other input signal capable of charging a conventional battery.

The DC supply DC IN is connected to a load battery to be charged B101 through two series-connected switches SW1O1 and SW102.

Switch SW101 is a main switch for disabling further charging. Main switch SW101 may be any conventional electromechanical or solid state single-pole single-throw relay switch of appropriate power rating. In addition, main switch SW101 may include a manual override to allow an operator to power-up or power-down the system.

Switch SW102 is a test switch for disabling further charging, and for instead applying a temporary load LlO1 across the terminals of the battery under charge B101. Test switch SW102 may be any conventional electromechanical or solid state double-pole single-throw relay switch of appropriate power rating. Test switch SW102 selectively disables further charging and applies temporary load L101 to battery B101 in accordance with an intermittent trigger signal received from a timing control circuit TC101.

Timing control circuit TC101 may be any conventional electromechanical or solid state timer, and it may be connected as shown in parallel between switches SW101 and SW102 to the (−) input terminal to be activated by DC IN upon closing of main switch SW101. Timing control circuit TC101 has an output connected to the throw-terminal of test switch SW102. When activated, timing control circuit TC101 begins to emit an intermittent control signal at predetermined time intervals. The timing control signal is applied to test switch SW102 in order to disable further charging and to instead apply the temporary load L101 to battery B101.

The temporary load L101 may comprise a simple resistance, inductance, capacitance, or any series-connected combination thereof which is calculated to drop a reference voltage when applied to battery B101 (i.e., when test switch SW102 is activated by timing control circuit TC101). Preferably, temporary load L101 comprises a series-connected resistance and capacitance chosen in accordance with the internal resistance of the battery to load the battery while the capacity is tested, and to form an RC circuit which charges upon the application of power from battery B101. This way, when test switch SW102 is activated and battery B101 is applied directly to the RC circuit of test load L101, the full battery B101 voltage will fall across the test load L101. At first, there will be no voltage drop due to the capacitive component of load L101 and the current drawn from battery B101 will be limited only by the resistive component. However, the capacitance of load L101 will begin to charge in accordance with the internal resistance of the battery B101 because the battery will be under load. Hence, the voltage falling across the resistive component of load L101 is inversely proportional to the internal resistance of battery B101. The peak voltage value falling across resistive component of load L101 will indicate the remaining charge capacity. This is based on the same principal for monitoring the remaining charge capacity as set forth in U.S. Pat. No. 5,126,675 issued to Yang (which patent is herein incorporated by reference), and the preferred RC circuit and resulting voltage curves are more apparent in light of said patent.

In addition, a voltage regulator VR101 is connected in parallel with temporary load L101 to allow calibration of the reference voltage developed across load L101. The voltage regulator may be any conventional potentiometer connected as shown to allow adjustment of the voltage reference. If the above-described RC circuit as set forth in Yang '675 is employed for the temporary load L101, then voltage regulator VR101 should only be connected across the resistive component thereof. Again, it is the voltage falling across the resistive component of load L101 which indicates the remaining charge capacity of battery B101, hence it is only necessary to calibrate the peak voltage value falling across resistive component of load L101.

Finally, a comparison circuit PD101 is connected as shown between voltage regulator VR101 and main switch SW101. Comparison circuit PD101 monitors the reference voltage appearing across temporary load L101 as calibrated by voltage regulator VR101. When the calibrated reference voltage corresponds to a predetermined threshold which is indicative that battery B101 has been charge saturated, then comparison circuit PD101 activates main switch SW101 to disable further charging of battery B101. Comparison circuit PD101 may likewise comprise any conventional electromechanical or electronic device capable of making a threshold comparison, and of activating a relay in accordance with the result.

Figure 2:
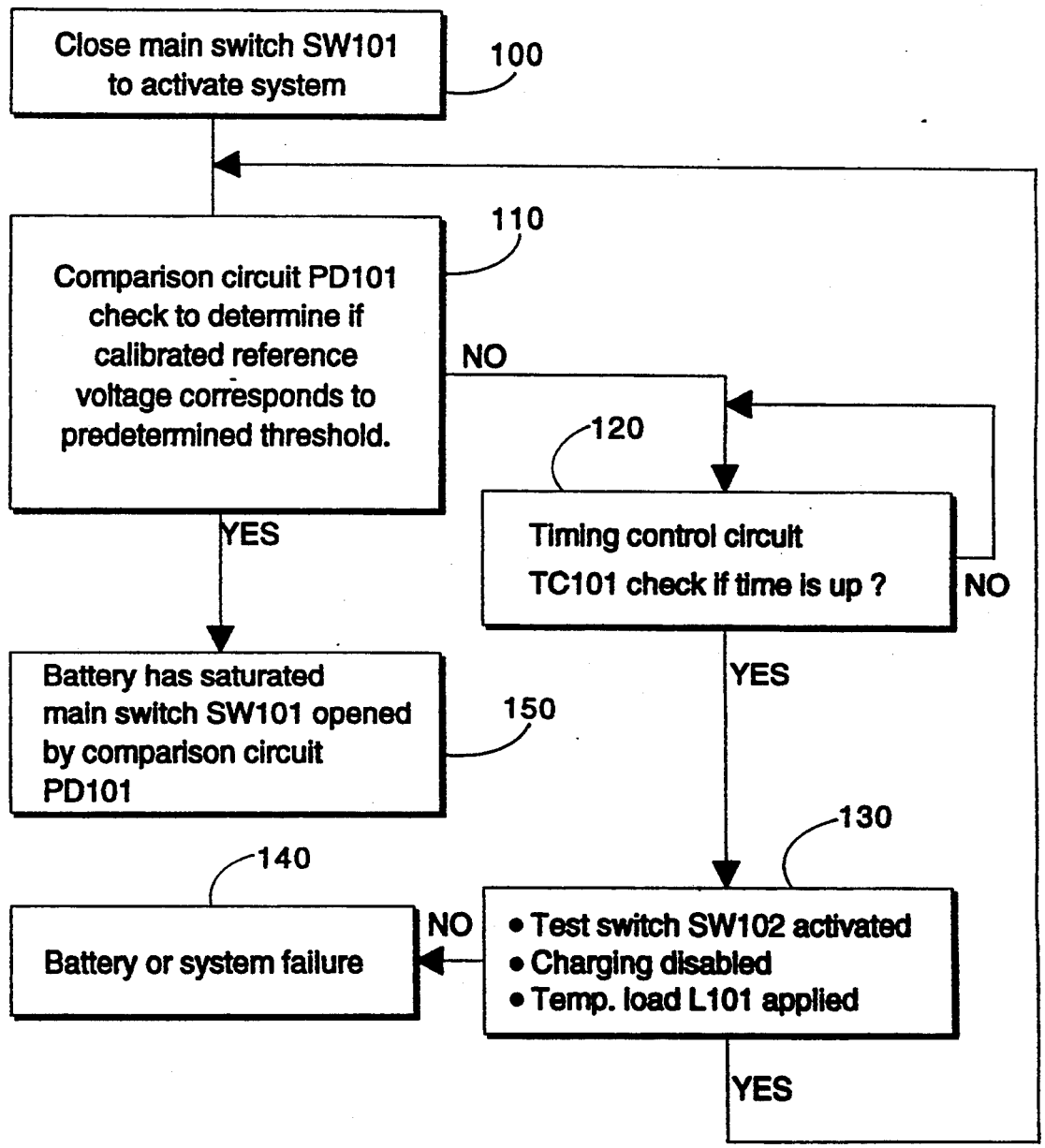
FIG. 2 is a flow-chart of the intermittent monitoring sequence employed in the present invention.

FIG. 2 is a flow-chart of the intermittent monitoring sequence employed in the present invention.

The sequence begins at step 100 by manually closing main switch SW101 in order to activate the charging system. At this point, DC IN power is applied through test switch SW102 to battery B101 for charging thereof. DC IN power will also be applied to activate comparison circuit PD101 and timing control circuit TC101.

The sequence continues to step 110 where the comparison circuit PD101 makes an initial determination as to whether the calibrated reference voltage falling across temporary load L101 corresponds to the predetermined threshold. Initially, test switch SW102 remains in the illustrated normally-closed position and no voltage will appear across temporary load L101. Hence, the sequence will continue to step 120.

At step 120, the timing control circuit TC101 checks to determine whether the appropriate time interval has passed, and if so, emits an intermittent control signal to test switch SW102.

The sequence then progresses to step 130, where test switch SW102 is activated to disable further charging and to instead apply the temporary load L101 to battery B101. This initiates the battery capacity test in accordance with the present invention.

The test is carried out at step 110 by comparison circuit PD101, which monitors the reference voltage appearing across temporary load L101 as calibrated by voltage regulator VR101.

When the calibrated reference voltage corresponds to a predetermined threshold which is indicative that battery B101 has been charge saturated, then the sequence continues to step 150 where comparison circuit PD101 activates main switch SW101 to disable further charging of battery B101.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. In an automatic shut-off charging system for charging a battery comprising
   a DC power supply,
   a main switch connected in series between said DC power supply and the battery for selectively applying DC power for charging of said battery,
   a timing control circuit for intermittently interrupting the series connection between said DC power supply and said battery,
   and a comparison circuit for monitoring a reference voltage of said battery, said comparison circuit also being connected to said main switch for energizing said main switch when the reference voltage corresponds to a predetermined threshold, thereby removing said DC power for charging of said battery and disabling further charging when said battery is already fully charged, an improvement comprising:
   a temporary load selectively connectable in parallel with said battery by means of a test switch to thereby establish the reference voltage indicative of an equivalent internal resistance of said battery, wherein said test switch is normally connected in series between said power supply and said battery, wherein said test switch is selectively energized by said timing control circuit at set time intervals to break the series connection between the DC power supply and said battery and to instead connect said temporary load in parallel with said battery, wherein said temporary load includes a series-connected resistance and capacitance, chosen in accordance with the equivalent internal resistance of said battery, wherein said comparison circuit is coupled in parallel across said resistance to monitor a peak value of the reference voltage falling across said resistance, and wherein said peak value of the reference voltage is indicative of a remaining charge capacity of said battery.

2. An automatic shut-off charging system for charging a battery comprising:
   a DC power supply;
   a main switch connected in series between said DC power supply and the battery for selectively applying DC power for charging of said battery;
   a temporary load selectively connectable in parallel with said battery to thereby establish a reference voltage indicative of an equivalent internal resistance of said battery;
   a test switch normally connected in series between said DC power supply and said battery, said test switch being selectively actuable to break the series connection between the DC power supply and said battery and to instead connect said temporary load in parallel with said battery;
   a timing control circuit connected to said test switch for intermittently energizing said test switch at set time intervals to break the series connection between the DC power supply and said battery, and to connect said temporary load in parallel with said battery;
   a comparison circuit coupled to said temporary load for monitoring the reference voltage appearing across said temporary load, said comparison circuit also being connected to said main switch for energizing said main switch when the reference voltage corresponds to a predetermined threshold, thereby removing said DC power for charging of said battery and disabling further charging when said battery is already fully charged; and a voltage regulator connected in parallel with said temporary load, said comparison circuit being coupled to said temporary load through said voltage regulator to allow calibration of the reference voltage developed across said temporary load.

3. The automatic shut-off charging system according to claim 2 wherein said voltage regulator is a potentiometer connected in parallel with said temporary load and having a tap lead connected to said comparison circuit.

4. The automatic shut-off charging system according to claim 2, wherein said temporary load further comprises a series-connected resistance and capacitance, chosen in accordance with the equivalent internal resistance of said battery, and said comparison circuit is coupled in parallel across said resistance to monitor a peak voltage value falling across said resistance as said capacitance charges.

5. The automatic shut-off charging system according to claim 2, wherein said DC power supply provides a rectified AC charging current.

6. The automatic shut-off charging system according to claim 2, wherein said DC power supply provides a commutated AC charging current.

7. The automatic shut-off charging system according to claim 2, wherein said DC power supply provides a pulsed DC charging current.

8. The improvement of claim 1, further including calibration means for calibrating the peak value of the reference voltage, wherein said calibration means are connected to said resistance.

* * * * *